United States Patent
Fuller et al.

(10) Patent No.: US 9,370,750 B2
(45) Date of Patent: Jun. 21, 2016

(54) POLYOLEFIN-PFCB IONOMER

(75) Inventors: Timothy J. Fuller, Pittsford, NY (US);
Lijun Zou, Rochester, NY (US);
Michael R. Schoeneweiss, West Henrietta, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 767 days.

(21) Appl. No.: 13/599,316

(22) Filed: Aug. 30, 2012

(65) Prior Publication Data
US 2014/0065514 A1    Mar. 6, 2014

(51) Int. Cl.
| | |
|---|---|
| H01M 8/10 | (2006.01) |
| H01M 2/14 | (2006.01) |
| H01M 2/16 | (2006.01) |
| B01D 71/82 | (2006.01) |
| C08J 5/22 | (2006.01) |

(52) U.S. Cl.
CPC ............... *B01D 71/82* (2013.01); *C08J 5/2218* (2013.01); *H01M 8/1039* (2013.01); *C08J 2327/12* (2013.01); *H01M 2300/0082* (2013.01); *Y02E 60/521* (2013.01); *Y02P 70/56* (2015.11)

(58) Field of Classification Search
USPC .................................... 429/494, 535; 521/27
See application file for complete search history.

(56) References Cited

U.S. PATENT DOCUMENTS

| | | |
|---|---|---|
| 7,888,433 B2 | 2/2011 | Fuller et al. |
| 7,897,691 B2 | 3/2011 | MacKinnon et al. |
| 7,897,692 B2 | 3/2011 | MacKinnon et al. |
| 7,897,693 B2 | 3/2011 | MacKinnon et al. |
| 2007/0099054 A1 | 5/2007 | Fuller et al. |

FOREIGN PATENT DOCUMENTS

DE    60010936 T2    6/2005

OTHER PUBLICATIONS

Spraul, B.K. et al, Synthesis and Electronic Factors in Thermal Cyclodimerization of Functionalized Aromatic Trifluorovinyl Ethers, J. Am. Chem. Soc. 2006, 128 (1), pp. 7055-7064.

*Primary Examiner* — Basia Ridley
*Assistant Examiner* — Caitlin Wilmot
(74) *Attorney, Agent, or Firm* — Brooks Kushman P.C.

(57) ABSTRACT

A method of making an ion conducting membrane includes a step of reacting a compound having formula 1 with a polymer having polymer segment 2:

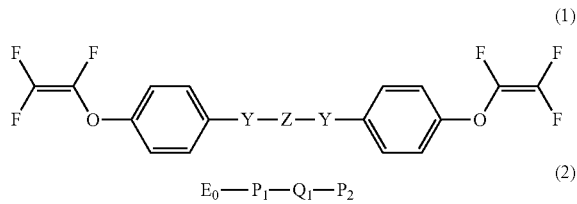

to form a copolymer having polymer segment 2 and polymer segment 3:

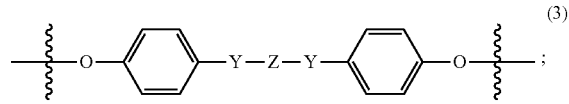

and
The copolymer having polymer segment 2 and polymer segment 3 are then formed into an ion conducting membrane, wherein Z is a $C_{6-80}$ aliphatic, polyether, or perfluoropolyether;
Y is a divalent linking group; $E_0$ is a hydrocarbon-containing moiety; $Q_1$ is a perfluorocyclobutyl moiety; $P_1$, $P_2$ are each independently absent, —O—, —S—, —SO—, —CO—, —SO$_2$—, —NH—, NR$_2$—, or —R$_3$—;
$R_2$ is $C_{1-25}$ alkyl, $C_{1-25}$ aryl or $C_{1-25}$ arylene; and $R_3$ is $C_{1-25}$ alkylene, $C_{1-25}$ perfluoroalkylene, perfluoroalkyl ether, alkylether, or $C_{1-25}$ arylene.

21 Claims, 8 Drawing Sheets

POLYOLEFIN-PFCB IONOMER

The present invention relates to ion conducting membranes for fuel cells.

BACKGROUND OF THE INVENTION

In proton exchange membrane type fuel cells, hydrogen is supplied to the anode as fuel, and oxygen is supplied to the cathode as the oxidant. The oxygen can either be in pure form ($O_2$) or air (a mixture of $O_2$ and $N_2$). PEM fuel cells typically have a membrane electrode assembly ("MEA") in which a solid polymer membrane has an anode catalyst on one face, and a cathode catalyst on the opposite face. The anode and cathode layers of a typical PEM fuel cell are formed of porous conductive materials, such as woven graphite, graphitized sheets, or carbon paper to enable the fuel to disperse over the surface of the membrane facing the fuel supply electrode. Typically, the ion conductive polymer membrane includes a perfluorosulfonic acid (PFSA) ionomer.

Each catalyst layer has finely divided catalyst particles (for example, platinum particles), supported on carbon particles, to promote oxidation of hydrogen at the anode, and reduction of oxygen at the cathode. Protons flow from the anode through the ion conductive polymer membrane to the cathode where they combine with oxygen to form water which is discharged from the cell.

The MEA is sandwiched between a pair of porous gas diffusion layers ("GDL"), which in turn are sandwiched between a pair of electrically conductive flow field elements or plates. The plates function as current collectors for the anode and the cathode, and contain appropriate channels and openings formed therein for distributing the fuel cell's gaseous reactants over the surface of respective anode and cathode catalysts. In order to produce electricity efficiently, the polymer electrolyte membrane of a PEM fuel cell must be thin, chemically stable, proton transmissive, non-electrically conductive and gas impermeable. In typical applications, fuel cells are provided in arrays of many individual fuel cells in stacks in order to provide high levels of electrical power.

In many fuel cell applications, electrode layers are formed from ink compositions that include a precious metal and a perfluorosulfonic acid polymer (PFSA). For example, PFSA is typically added to the Pt/C catalyst ink in electrode layer fabrication of proton exchange membrane fuel cells to provide proton conduction to the dispersed Pt nanoparticle catalyst as well as binding of the porous carbon network. Traditional fuel cell catalysts combine carbon black with platinum deposits on the surface of the carbon, along with ionomers. The carbon black provides (in part) a high surface area conductive substrate. The platinum deposits provide a catalytic behavior, and the ionomers provide a proton conductive component. The electrode is formed from an ink that contains the carbon black catalyst and the ionomer, which combine on drying to form an electrode layer.

Accordingly, the present invention provides improved methods of making ion conducting membranes for fuel cell applications.

SUMMARY OF THE INVENTION

The present invention solves one or more problems of the prior art by providing in at least one embodiment a method of making an ion conducting membrane. The method includes a step of reacting a compound having formula 1 with a polymer having polymer segment 2:

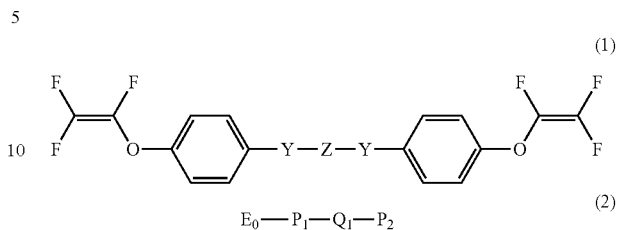

(1)

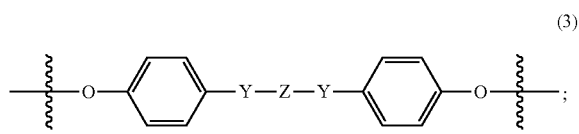

(2)

to form a copolymer having polymer segment 2 and polymer segment 3:

(3)

and
The copolymer having polymer segment 2 and polymer segment 3 are then formed into an ion conducting membrane, wherein:
$Z$ is a $C_{6-80}$ aliphatic, polyether, or perfluoropolyether;
$Y$ is a divalent linking group;
$E_0$ is a hydrocarbon-containing moiety;
$Q_1$ is a perfluorocyclobutyl moiety;
$P_1$, $P_2$ are each independently absent, —O—, —S—, —SO—, —CO—, —$SO_2$—, —NH—, $NR_2$—, or —$R_3$—;
$R_2$ is $C_{1-25}$ alkyl, $C_{1-25}$ aryl or $C_{1-25}$ arylene; and
$R_3$ is $C_{1-25}$ alkylene, $C_{1-25}$ perfluoroalkylene, perfluoroalkyl ether, alkylether, or $C_{1-25}$ arylene.

In another embodiment of the present invention, a method of making an ion conducting membrane is provided. The method includes:

a) reacting a compound having formula 1 with a polymer having polymer segment 4:

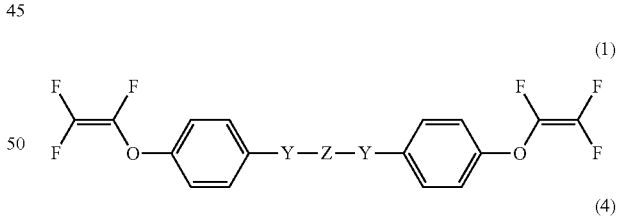

(1)

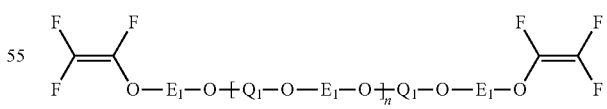

(4)

to form a copolymer having polymer segment 5:

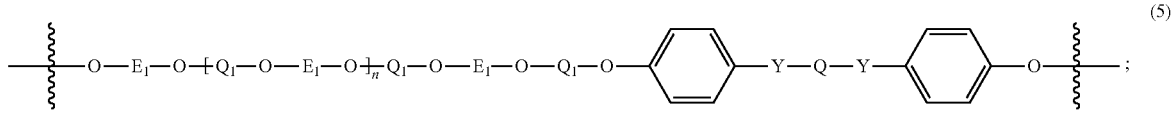

(5)

and b) forming the copolymer having polymer segment 5 into an ion conducting membrane,
wherein:
n is a number from 5 to 60;
$Q_1$ is a perfluorocyclobutyl moiety;
$E_1$ is an aromatic containing moiety;
Z is a $C_{6-80}$ aliphatic, polyether, or perfluoropolyether; and
Y is a divalent linking group.

In still another embodiment of the present invention, a method of making an ion conducting membrane is provided. The method comprises:

a) reacting a compound having formula 1 with a polymer having formula 6:

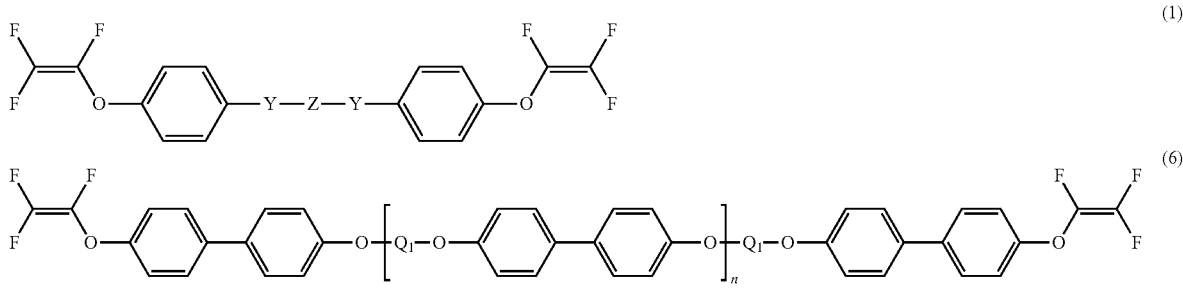

to form a copolymer having polymer segment 7:

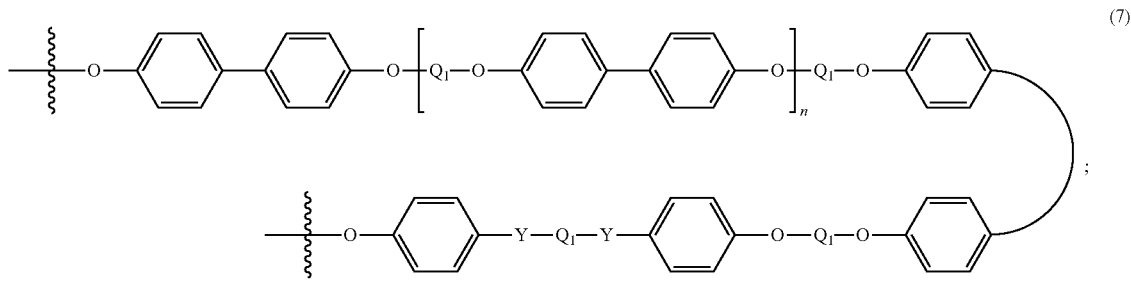

and b) forming the copolymer having polymer segment 7 into an ion conducting membrane,
wherein:
n is a number from 5 to 60;
$Q_1$ is a perfluorocyclobutyl moiety;
Z is a $C_{6-80}$ aliphatic, polyether, or perfluoropolyether;
$E_1$ is an aromatic containing moiety; and
Y is a divalent linking group.

BRIEF DESCRIPTION OF THE DRAWINGS

Exemplary embodiments of the present invention will become more fully understood from the detailed description and the accompanying drawings, wherein.

DESCRIPTION OF THE INVENTION

Figure 1:
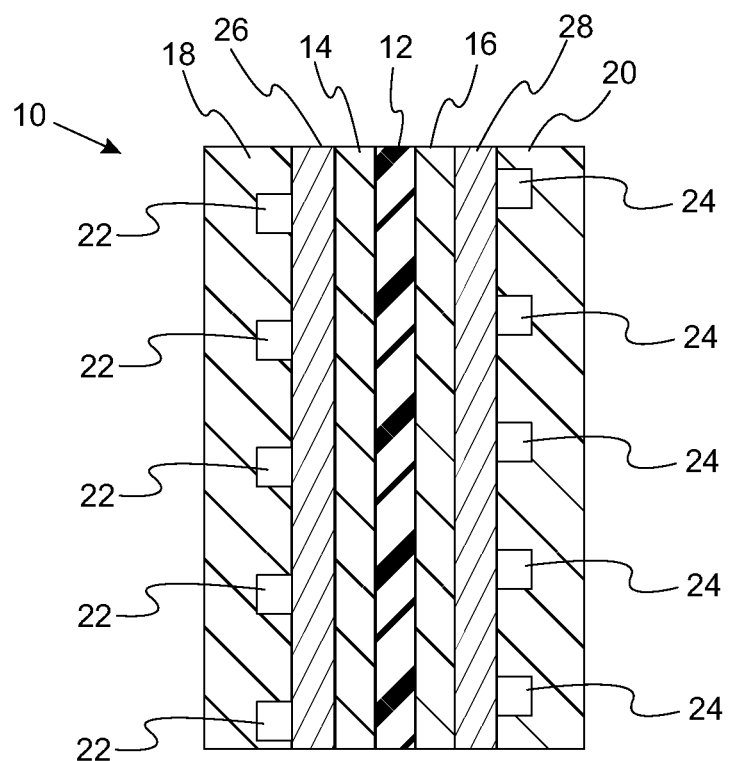
FIG. 1 provides a schematic illustration of a fuel cell incorporating polymeric ion conducting membrane.

Reference will now be made in detail to presently preferred compositions, embodiments and methods of the present invention, which constitute the best modes of practicing the invention presently known to the inventors. The Figures are not necessarily to scale. However, it is to be understood that the disclosed embodiments are merely exemplary of the invention that may be embodied in various and alternative forms. Therefore, specific details disclosed herein are not to be interpreted as limiting, but merely as a representative basis for any aspect of the invention and/or as a representative basis for teaching one skilled in the art to variously employ the present invention.

Except in the examples, or where otherwise expressly indicated, all numerical quantities in this description indicating amounts of material or conditions of reaction and/or use are to be understood as modified by the word "about" in describing the broadest scope of the invention. Practice within the numerical limits stated is generally preferred. Also, unless expressly stated to the contrary: percent, "parts of," and ratio values are by weight; the term "polymer" includes "oligomer," "copolymer," "terpolymer," and the like; the description of a group or class of materials as suitable or preferred for a given purpose in connection with the invention implies that mixtures of any two or more of the members of the group or class are equally suitable or preferred; molecular weights provided for any polymers refers to number average molecular weight; description of constituents in chemical terms refers to the constituents at the time of addition to any combination specified in the description, and does not necessarily preclude chemical interactions among the constituents of a mixture once mixed; the first definition of an acronym or other abbreviation applies to all subsequent uses herein of the same abbreviation and applies mutatis mutandis to normal grammatical variations of the initially defined abbreviation; and, unless expressly stated to the contrary, measurement of a property is determined by the same technique as previously or later referenced for the same property.

It is also to be understood that this invention is not limited to the specific embodiments and methods described below, as specific components and/or conditions may, of course, vary. Furthermore, the terminology used herein is used only for the purpose of describing particular embodiments of the present invention and is not intended to be limiting in any way.

It must also be noted that, as used in the specification and the appended claims, the singular form "a," "an," and "the" comprise plural referents unless the context clearly indicates otherwise. For example, reference to a component in the singular is intended to comprise a plurality of components.

Throughout this application, where publications are referenced, the disclosures of these publications in their entireties are hereby incorporated by reference into this application to more fully describe the state of the art to which this invention pertains.

With reference to FIG. 1, a schematic cross section of a fuel cell that incorporates an embodiment of a fibrous sheet is provided. Proton exchange membrane (PEM) fuel cell 10 includes polymeric ion conducting membrane 12 disposed between cathode catalyst layer 14 and anode catalyst layer 16. Fuel cell 10 also includes flow field plates 18, 20, gas channels 22 and 24, and gas diffusion layers 26 and 28. Advantageously, polymeric ion conducting membrane 12 includes the polymers and is made by the methods set forth below. During operation of the fuel cell, a fuel such as hydrogen is fed to the flow field plate 20 on the anode side and an oxidant such as oxygen is fed flow field plate 18 on the cathode side. Hydrogen ions are generated by anode catalyst layer 16 migrate through polymeric ion conducting membrane 12 were they react at cathode catalyst layer 14 to form water. This electrochemical process generates an electric current through a load connect to flow field plates 18 and 20.

In at least one embodiment a method of making an ion conducting membrane is provided. The method includes a step of reacting a compound having formula 1 with a polymer having polymer segment 2:

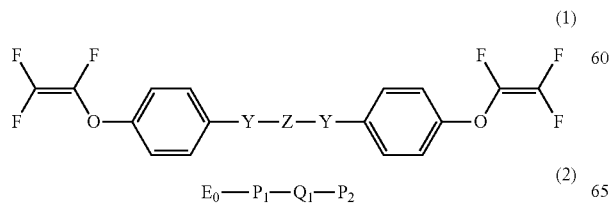

to form a copolymer having polymer segment 2 and polymer segment 3:

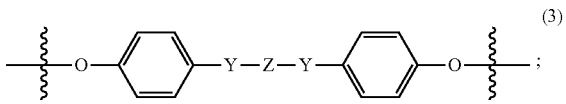

and

The copolymer having polymer segment 2 and polymer segment 3 are then formed into an ion conducting membrane, wherein:

Z is a $C_{6-80}$ aliphatic, polyether, or perfluoropolyether;

Y is a divalent linking group.

$E_0$ is a hydrocarbon-containing moiety;

$Q_1$ is a perfluorocyclobutyl moiety;

$P_1$, $P_2$ are each independently absent, —O—, —S—, —SO—, —CO—, —$SO_2$—, —NH—, $NR_2$—, or —$R_3$—;

$R_2$ is $C_{1-25}$ alkyl, $C_{1-25}$ aryl or $C_{1-25}$ arylene; and $R_3$ is $C_{1-25}$ alkylene, $C_{1-25}$ perfluoroalkylene, perfluoroalkyl ether, alkylether, or $C_{1-25}$ arylene. In general, the polymer having polymer segment 2 will be functionalized with trifluorovinyl groups and in particular with

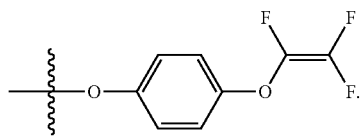 [SMILES: *Oc1ccc(OC(F)=C(F)F)cc1]

Examples of polymers including perfluorocyclobutyl (PFCB polymers) moieties are disclosed in U.S. Pat. Pub. No. 2007/0099054, U.S. patent application Ser. No. 12/197,530 filed Aug. 25, 2008; Ser. No. 12/197,537 filed Aug. 25, 2008; Ser. No. 12/197,545 filed Aug. 25, 2008; and Ser. No. 12/197,704 filed Aug. 25, 2008; the entire disclosures of which are hereby incorporated by reference. Such functionalized polymer having polymer segment (2) may therefore be represented by the following formula:

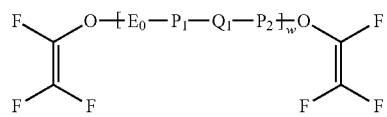

where w is a number from about 5 to about 100.

In a refinement, Z is $C_{6-80}$ alkyl or $C_{6-80}$ alkenyl. In another refinement, Y is O, NH, S, or

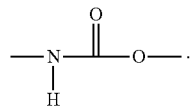

In a variation of the present embodiment, the ion conducting membrane is incorporated into a fuel cell. In another variation of the present embodiment, the copolymer having polymer segment 2 and polymer segment 3 is sulfonated.

In a refinement of the present embodiment, Z is

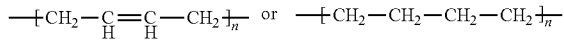

and n is an integer from 5 to 50. In still another variation, Z is

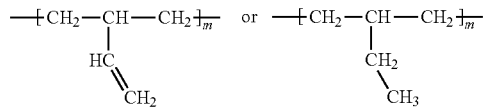

and m is an integer from 5 to 50. In yet another refinement, Z is

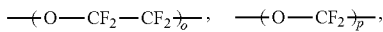, 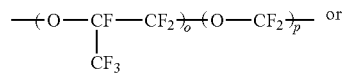

and o a p are each independently an integer from 5 to 50. In still another refinement, Z is:

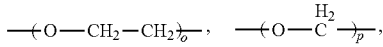, 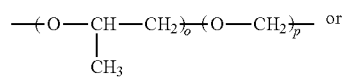

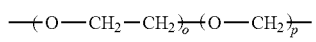

and o a p are each independently an integer from 5 to 50.

In another embodiment of the present invention, a method of making an ion conducting membrane is provided. The method includes:

a) reacting a compound having formula 1 with a polymer having polymer segment 4:

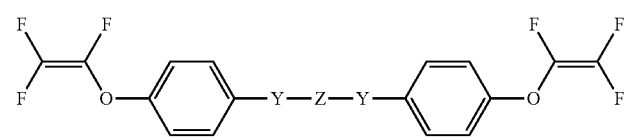

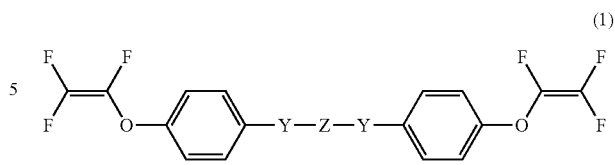

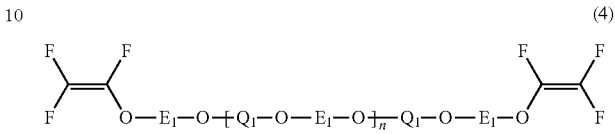

to form a copolymer having polymer segment 5:

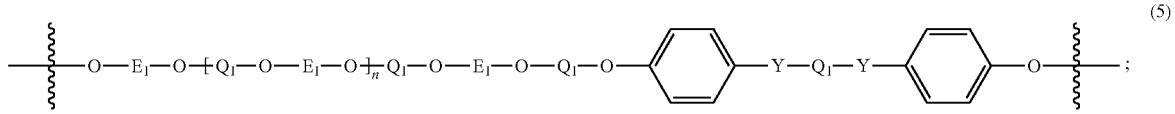

and b) forming the copolymer having polymer segment 5 into an ion conducting membrane, wherein:

n is a number from 5 to 60;

$Q_1$ is a perfluorocyclobutyl moiety;

$E_1$ is an aromatic containing moiety;

Z is a $C_{6-80}$ aliphatic, polyether, or perfluoropolyether; and

Y is a divalent linking group. In a refinement, Z is $C_{6-80}$ alkyl or $C_{6-80}$ alkenyl. In another refinement, Y is O, NH, S, or

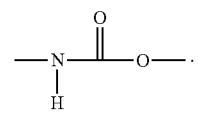

In a refinement, Z also embraces the refinements set forth above. In a variation of the present invention, the ion conducting membrane is incorporated into a fuel cell. In another variation, the copolymer having polymer segment 5 is sulfonated.

In still another embodiment of the present invention, a method of making an ion conducting membrane is provided. The method comprises:

a) reacting a compound having formula 1 with a polymer having formula 6:

-continued

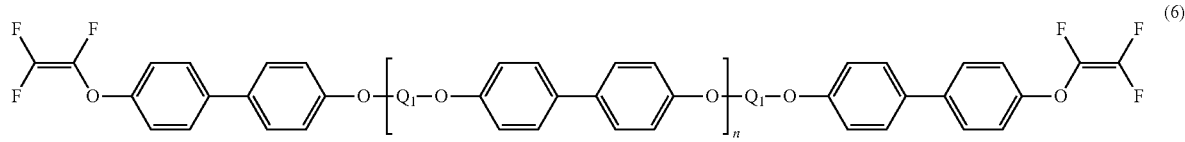

to form a copolymer having polymer segment 7:

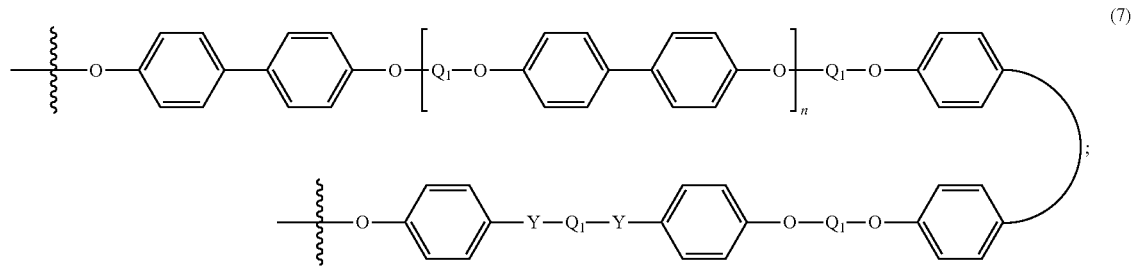

and b) forming the copolymer having polymer segment 7 into an ion conducting membrane, wherein:

n is a number from 5 to 60;

$Q_1$ is a perfluorocyclobutyl moiety;

Z is a $C_{6-80}$ aliphatic, polyether, or perfluoropolyether;

$E_1$ is an aromatic containing moiety; and

Y is a divalent linking group. In a refinement, Z is $C_{6-80}$ alkyl or $C_{6-80}$ alkenyl. In another refinement, Y is O, NH, S, or $$-\underset{H}{N}-\overset{O}{\underset{\|}{C}}-O-$$

In a refinement, Z also embraces the refinements set forth above. In a variation of the present invention, the ion conducting membrane is incorporated into a fuel cell. In another variation, the copolymer having polymer segment 5 is sulfonated.

Figure 2:
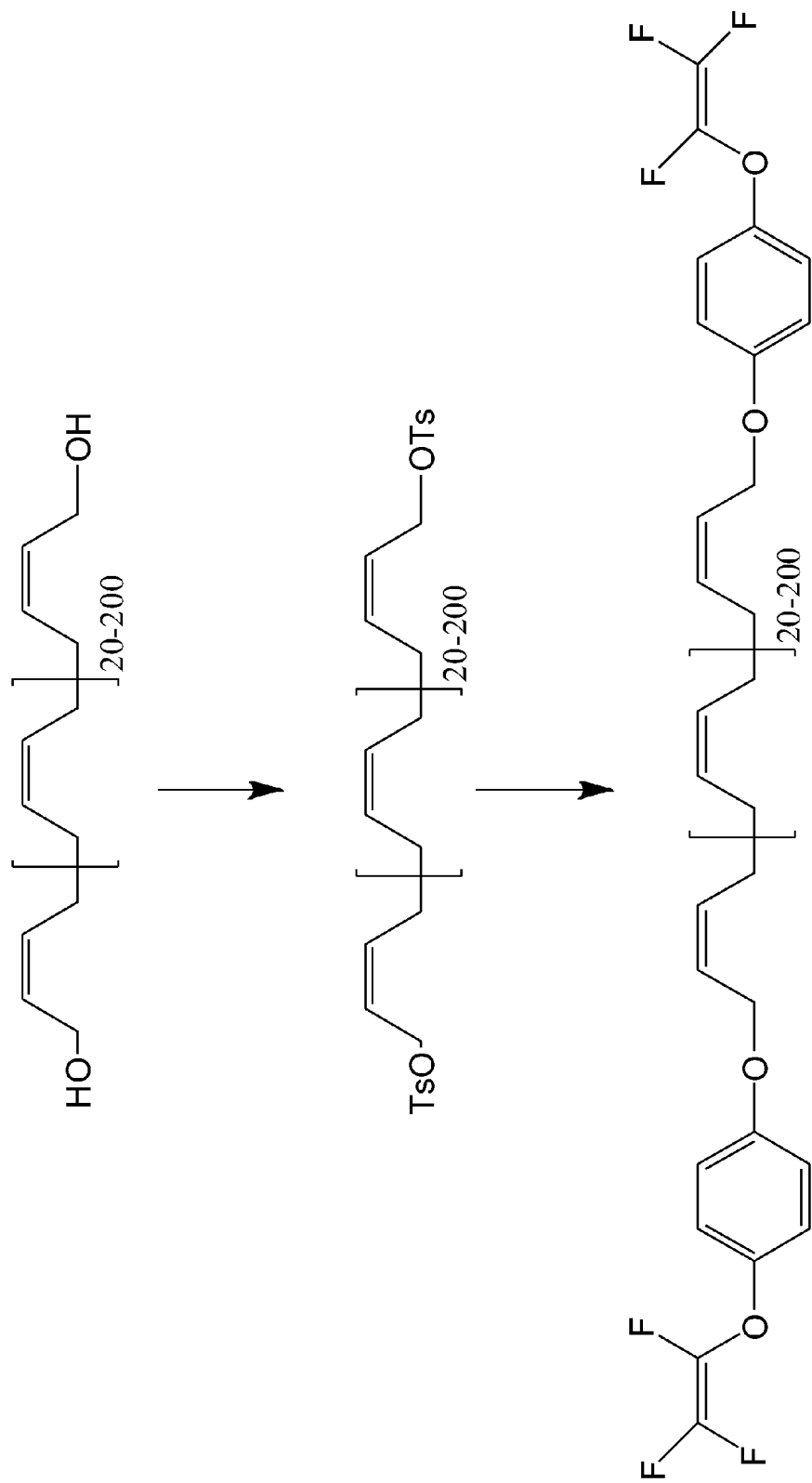
FIG. 2 provides a synthetic scheme for forming a compound having formula (1).

FIG. 2 provides a synthetic scheme for forming a compound having formula (1). In accordance with this scheme a polymeric backbone having repeating —$CH_2$—CH=CH—$CH_2$— groups and hydroxyl groups on each end is tosylated and then functionalized with:

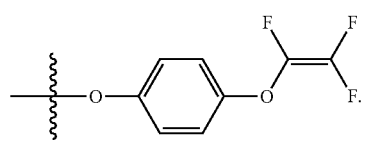

Figure 3:
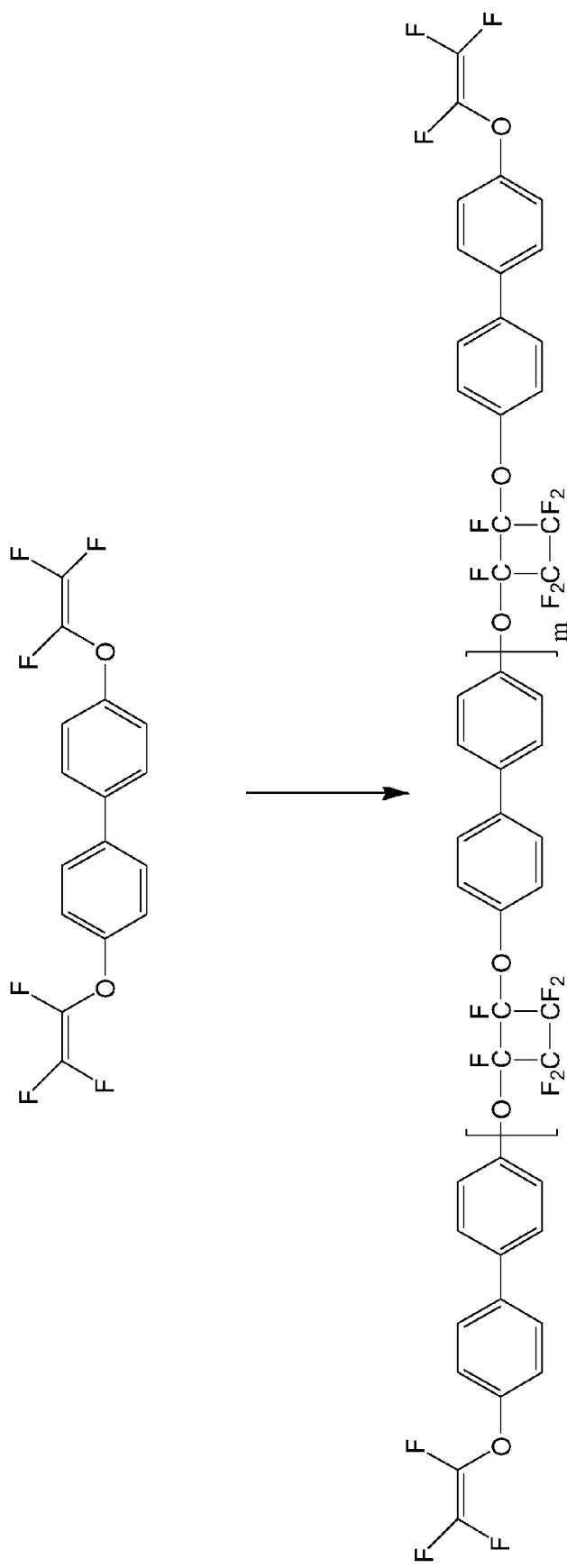
FIGS. 3 and 4 provide synthetic schemes for forming compounds having polymer segment 2 which characteristically include perfluorocyclobutyl moieties.
Figure 4:
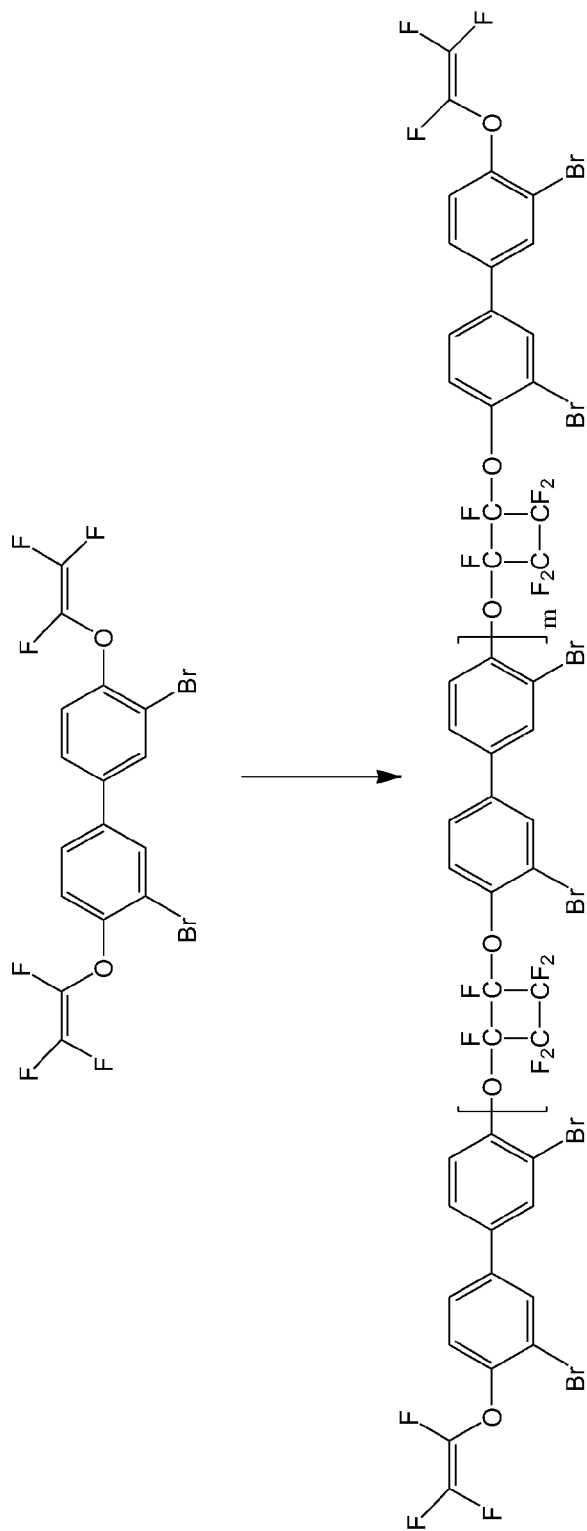
Figure 5:
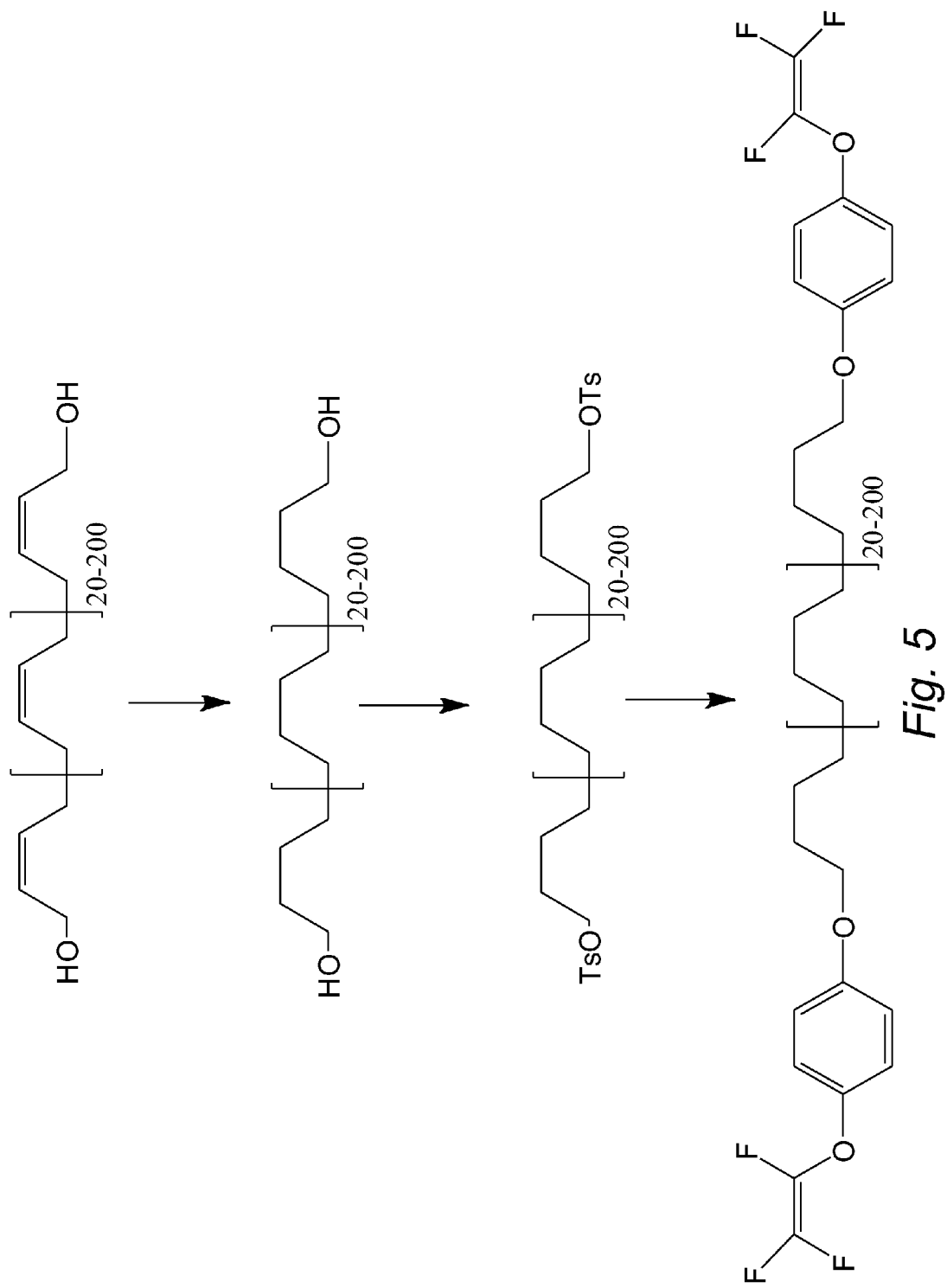
FIG. 5 provides a synthetic scheme for forming a compound having formula (1)
Figure 6:
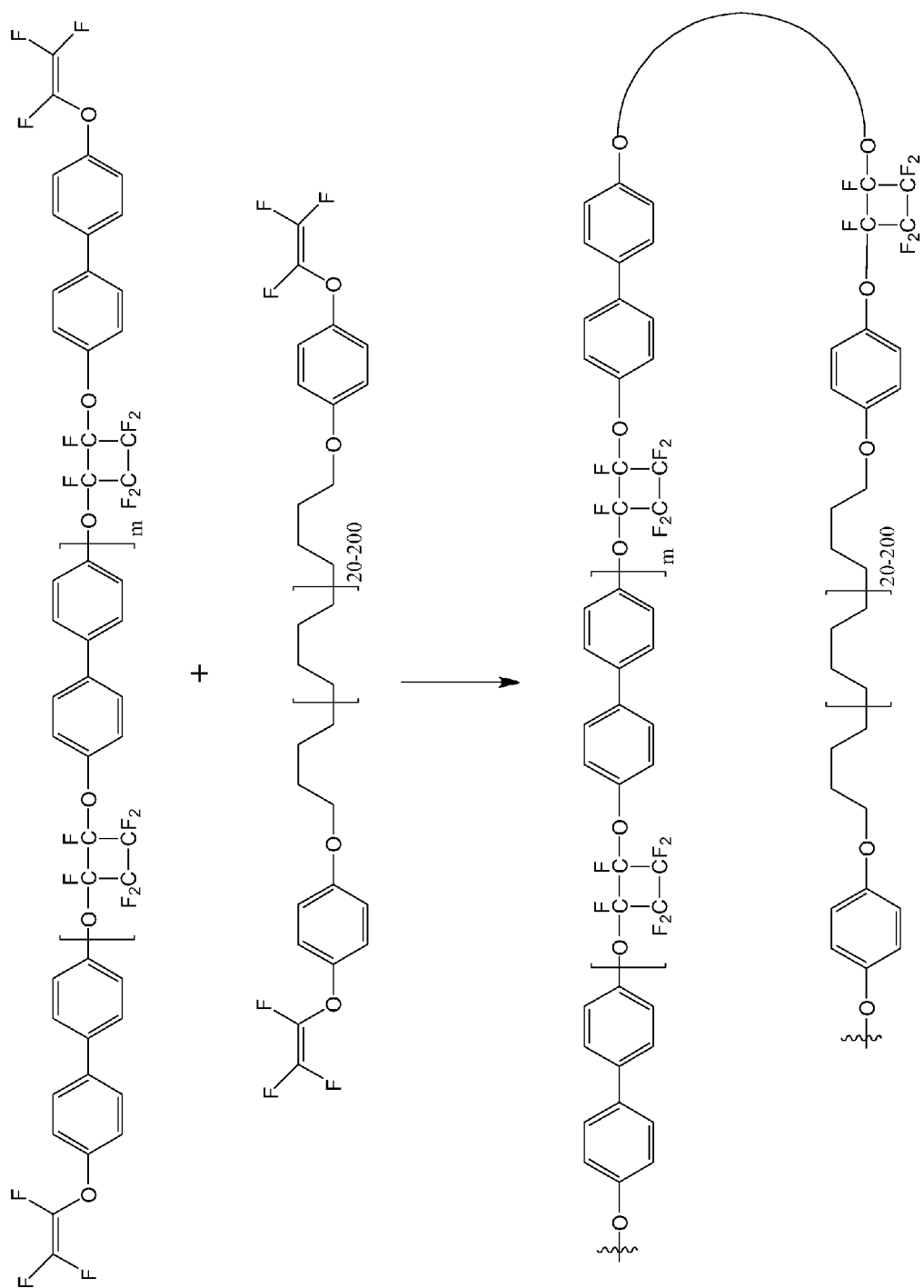
FIG. 6 provides a synthetic scheme in which the compounds from FIG. 2 is reacted with the compound formed in FIG. 3 to form a polymer that is useful for forming ion conducting membranes for fuel cells.
Figure 7:
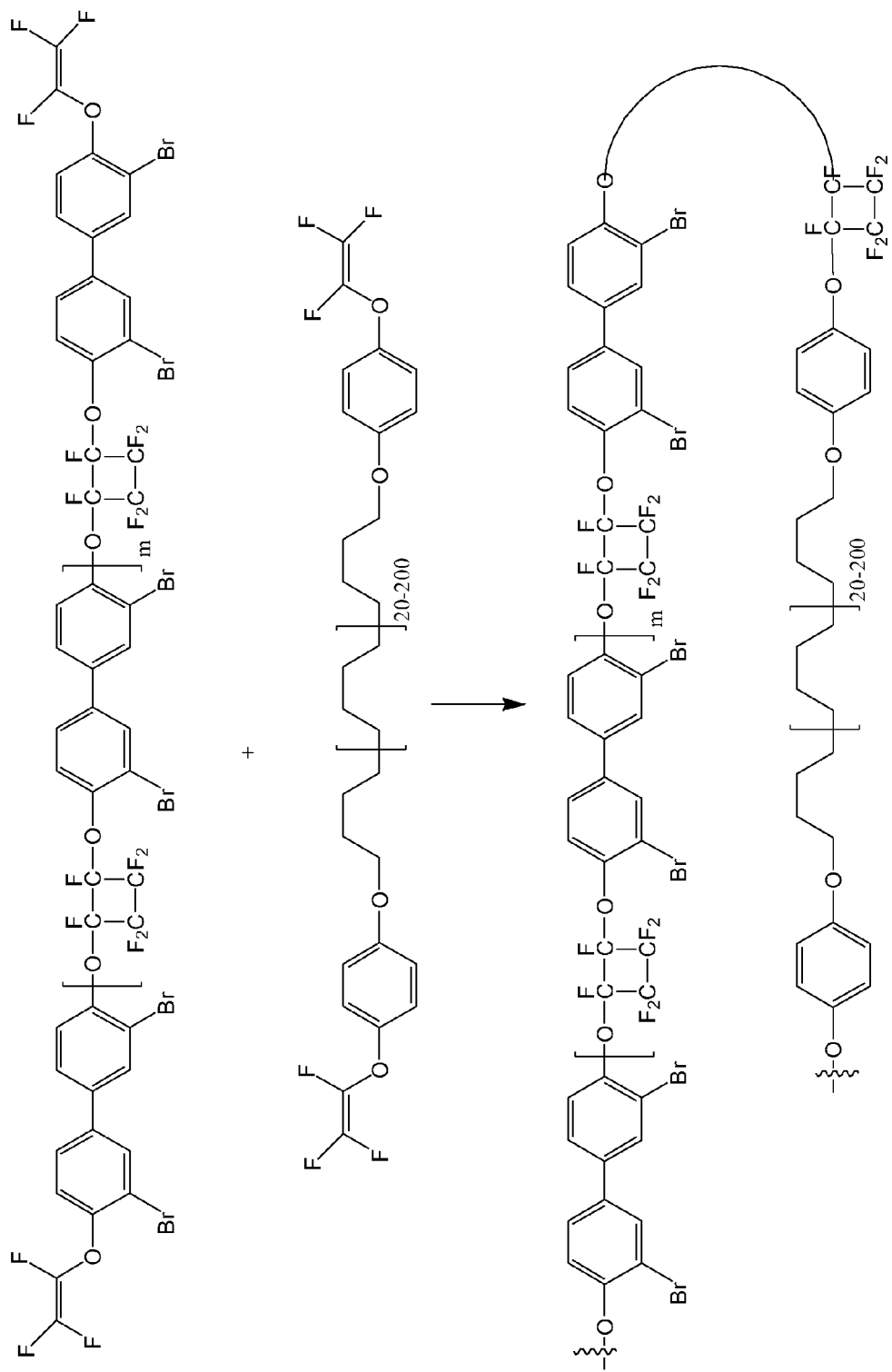
FIG. 7 provides a synthetic scheme in which the compounds from FIG. 4 is reacted with the compound formed in FIG. 5 to form a polymer that is useful for forming ion conducting membranes for fuel cells.
Figure 8:
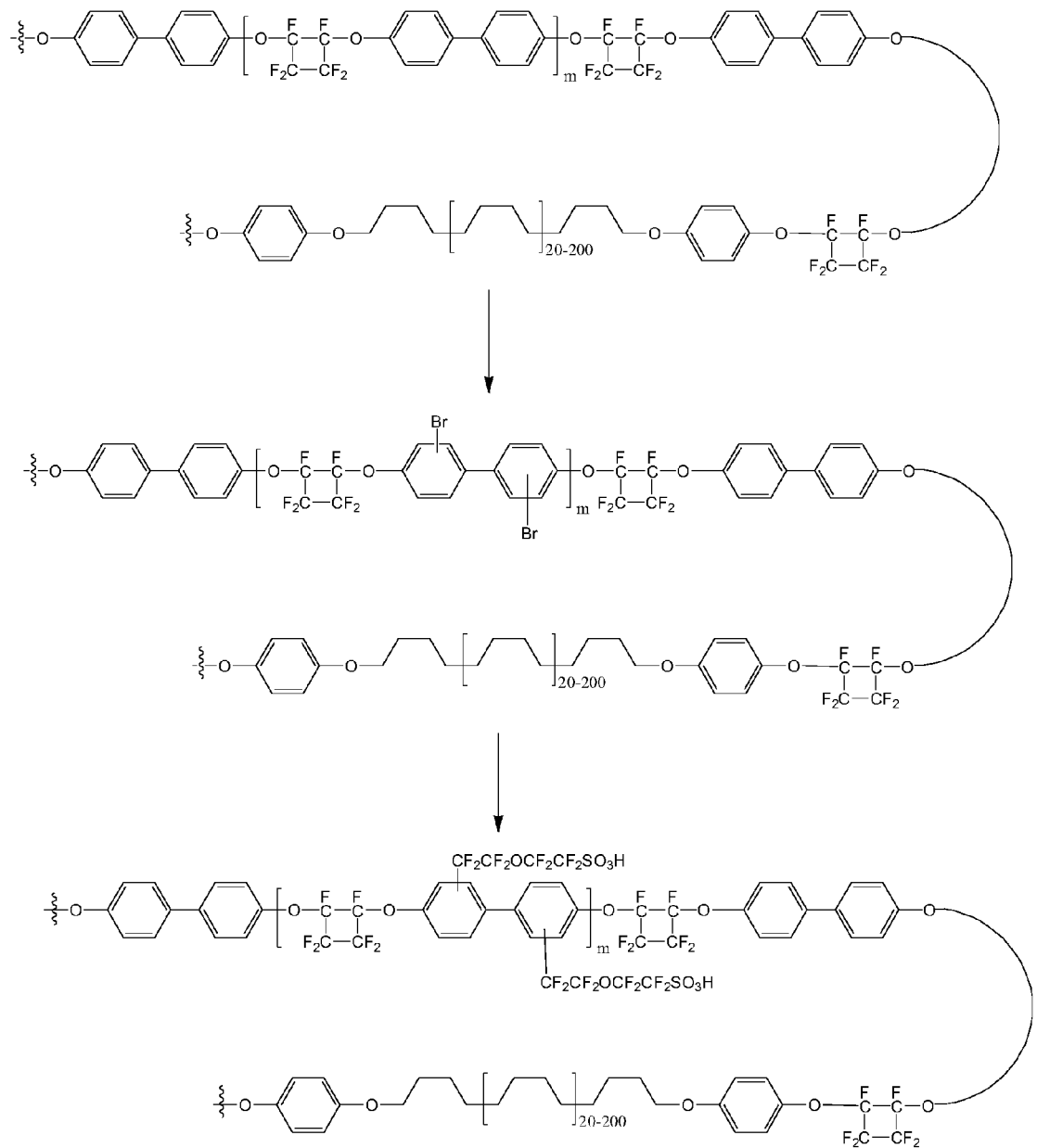
FIG. 8 provides a synthetic scheme in which side groups are added to a polymer that useful for forming ion conducting membranes for fuel cells.

FIGS. 3 and 4 provide synthetic schemes for forming compounds having polymer segment 2 which characteristically include perfluorocyclobutyl moieties. FIG. 5 provides a synthetic scheme for forming a compound having formula (1) In accordance with this scheme a polymeric backbone having repeating —$CH_2$—$CH_2$—$CH_2$—$CH_2$— groups and hydroxyl groups on each end is tosylated and then function- alized. FIG. 6 provides a synthetic scheme in which the compounds from FIG. 2 are reacted with the compound formed in FIG. 3 to form a polymer that is useful for forming ion conducting membranes for fuel cells. FIG. 7 provides a synthetic scheme in which the compounds from FIG. 4 is reacted with the compound formed in FIG. 5 to form a polymer that is useful for forming ion conducting membranes for fuel cells. FIG. 8 provides a synthetic scheme in which side groups are added to a polymer that useful for forming ion conducting membranes for fuel cells.

Example 1

Preparation of the Ditosylate of Polybutadiene-Diol (2,300 Molecular Weight)

Polybutadiene-diol (Scientific Polymer Products, 5 g, 0.004348 mol of OH) is mechanically stirred under argon with p-toluenesulfonyl chloride (Aldrich, 0.681 g, 0.004779 mol) and dry pyridine (0.3775 g, 0.00478 mol) in methylene chloride (100 mL) at 23° C. for 48 hours. The reaction mixture is pressure filtered under nitrogen through a 5-micrometer Mitex Millipore filter (74 mm) and the filtrate is washed with water (100 mL), dried over sodium sulfate, and then filtered. The solvent is removed from the filtrate using a rotary evaporator, and the residue is washed with methanol and then vacuum dried to yield the ditosylate of polybutadiene-diol (5 g).

Example 2

Preparation of the Bis(Perfluorovinyl Ether) of Polybutadiene

The ditosylate of polybutadiene-diol (5 g, Example 1) is dissolved in freshly distilled tetrahydrofuran (100 mL) and is allowed to react with p-$CF_2$=CF—$OC_6H_4OH$ [4,4'-bis((1,2, 2-trifluorovinyl)oxy)-1,1'-biphenyl, 0.982 g, 0.00472 mol, reference B. K. Spraul, S. Suresh, J. Jin, D. W. Smith, Jr., *J. Am. Chem. Soc.* 2006, 128 (1), 7055-7064.] and with excess sodium hydride for 48 hours at 23° C. with mechanical stirring under argon. The reaction mixture is then filtered under nitrogen and the solids are cautiously neutralized with methanol. The solvent is removed from the filtrate and the resulting bis(perfluorovinyl-terminated polybutadiene) is dissolved in methylene chloride (100 mL) and extracted with 5 wt. % aqueous sodium hydroxide (50 mL) and then with water (1000 mL). The methylene chloride layer is dried over sodium sulfate, filtered, and then the solvent is removed using a rotary evaporator. The residue is then vacuum dried at 23° C. This residue is the bis(perfluorovinylether) of polybutadiene-diol, which is further allowed to react with a bis(perfluorovinyl-terminated-8000 molecular weight perfluorocyclobutane) oligomer made from 3,3'-dibromo-4,4'-bis((1,2,2-trifluorovinyl)oxy)-1,1'-biphenyl, as described in Examples 4 and 8.

Example 3

Poly[4,4'-Bis((1,2,2-Trifluorovinyl)Oxy)-1,1'-Biphenyl] (8K-BPVE)

An 8,000 molecular weight cycloaddition polymer of 4,4'-bis((1,2,2-trifluorovinyl)oxy)-1,1'-biphenyl is purchased from Tetramer Technologies, LLC (Pendleton, S.C.) and is designated 8K-BPVE. The polymerization of 4,4'-bis((1,2,2-trifluorovinyl)oxy)-1,1'-biphenyl to make 8K-BPVE is carried out as follows: BPVE monomer [4,4'-bis((1,2,2-trifluorovinyl)oxy)-1,1'-biphenyl, 600 g] is dissolved in diphenyl ether (DPE, 150 g) and purged with bubbling argon for 30 minutes. The monomer solution is then heated under argon as follows: (i) 140° C., 18 h; (ii) 160° C., 8 h; and (iii) 180° C., 18 h. The reaction is then cooled to 60° C. and THF is added to fully dissolve the oligomer. The product is precipitated as a white solid by pouring the THF solution into vigorously stirred methanol. After extensive washing with methanol using a Soxhlet extractor to remove very low molecular weight material, the product is dried 16 hours at 60° C. under vacuum. Yield=80%. [GPC Sample #1—Mn=8.5 kg/mol, DPI=2.38].

Example 4

Poly[3,3'-Dibromo-4,4'-Bis((1,2,2-Trifluorovinyl)Oxy)-1,1'-Biphenyl] (8K-Br-BPVE)

An 8,000 molecular weight cycloaddition polymer of 3,3'-dibromo-4,4'-bis((1,2,2-trifluorovinyl)oxy)-1,1'-biphenyl is purchased from Tetramer Technologies, LLC (Pendleton, S.C.) and is designated 8K-Br-BPVE. Oligomerization of Br-BPVE monomer is as follows: The brominated monomer (3,3'-dibromo-4,4'-bis((1,2,2-trifluorovinyl)oxy)-1,1'-biphenyl, 5 g) is heated in diphenyl ether solvent (50 g) at 160° C. under argon. Analysis of a sample taken after 20 hours indicated Mn~5 kg/mol (GPC). After an additional 18 hours at 160° C., GPC analysis indicates that the target Mn of ~8 kg/mol has been reached. The polymer solution is allowed to cool to 23° C. under argon, is dissolved in THF and then is precipitated into methanol to give a fine white powder. This powder is isolated by filtration and washed extensively with methanol using a Soxhlet extractor in order to remove residual diphenyl ether. GPC analysis of this purified oligomer (isolated in 75% yield) indicates a molecular weight of Mn=8.9 kg/mol, PDI=1.9. $^{19}$F NMR spectrum confirms the GPC result.

Example 5

Hydrogenation of Polybutadiene-Diol (2,300 Molecular Weight) with p-Toluenesulfonyl Hydrazide Polybutadiene-diol (Scientific Polymer Products, 5 g, 0.0926 mol of olefin) is mechanically stirred under argon with p-toluenesulfonyl hydrazide (Aldrich, 18.94 g, 0.1018 mol) in toluene (100 mL) and is boiled at reflux for 3 days. The reaction mixture is pressure filtered under nitrogen through a 5-micrometer Mitex Millipore filter (74 mm) and the filtrate is washed with water (100 mL), dried over sodium sulfate, and then filtered. The solvent is removed from the filtrate using a rotary evaporator, and the residue is washed with methanol and then vacuum dried to yield hydrogenated polybutadiene-diol (polyethylene-butylene-diol, 5 g).

Example 6

Preparation of the Ditosylate of Hydrogenated Polybutadiene-Diol (2,300 Molecular Weight)

Hydrogenated polybutadiene-diol (polyethylene-butylene-diol, 5 g, 0.004348 mol of OH) is mechanically stirred under argon with p-toluenesulfonyl chloride (Aldrich, 0.681 g, 0.004779 mol) and dry pyridine (0.3775 g, 0.00478 mol) in methylene chloride (100 mL) at 23° C. for 48 hours. The reaction mixture is pressure filtered under nitrogen through a 5-micrometer Mitex Millipore filter (74 mm) and the filtrate is washed with water (100 mL), dried over sodium sulfate, and then filtered. The solvent is removed from the filtrate using a rotary evaporator, and the residue is vacuum dried to yield the ditosylate of reduced polybutadiene-diol (polyethylene-butylene-diol, 5 g).

Example 7

Preparation of the Bis(Perfluorovinyl Ether) of Hydrogenated Polybutadiene-Diol

The ditosylate of hydrogenated polybutadiene (5 g, Example 16) is dissolved in freshly distilled tetrahydrofuran (100 mL) and is allowed to react with p-$CF_2$=CF—$OC_6H_4OH$ [4,4'-bis((1,2,2-trifluorovinyl)oxy)-1,1'-biphenyl, 0.9082 g, 0.00478 mol, reference B. K. Spraul, S. Suresh, J. Jin, D. W. Smith, Jr., *J. Am. Chem. Soc.* 2006, 128 (1), 7055-7064] with excess sodium hydride for 48 hours at 23° C. The reaction mixture is then filtered under nitrogen and the solids are cautiously neutralized with methanol. The solvent is removed from the filtrate and the resulting bis(perfluorovinyl-terminated polybutadiene) is dissolved in methylene chloride (100 mL) and extracted 5 wt. % aqueous sodium hydroxide (50 mL) and then with water (1000 mL). The methylene chloride layer is dried over sodium sulfate, filtered, and then the solvent is removed using a rotary evaporator. The residue is then vacuum dried at 23° C. This residue is the bis(perfluorovinylether) of polybutadiene, which is allowed to react with a bis(perfluorovinyl-terminated-8000 molecular weight perfluorocyclobutane) polymer made from 3,3'-dibromo-4,4'-bis((1,2,2-trifluorovinyl)oxy)-1,1'-biphenyl, as described in Example 9.

Example 8

Polymerization of the Bis(Perfluorovinyl Ether) of Polybutadiene with (8K-BPVE)

The polymer 8K-BPVE (4.2 g) and the bis(perfluorovinyl ether) of polybutadiene diol (3 g, Example 72) are heated at 250° C. in phenyl ether (100 mL) in a Parr pressure reactor for 16 h. The polymer is precipitated into methanol (1 Liter) using a Waring blender and then extracted with methanol using a Soxhlet extractor. The solid is then vacuum dried to yield 6 grams of brown polymer.

Example 9

Polymerization of the Bis(Perfluorovinyl Ether) of Hydrogenated Polybutadiene with (8K-BPVE)

The polymer 8K-BPVE (4.2 g) and the bis(perfluorovinyl ether) of hydrogenated polybutadiene diol (3 g, polyethylene-butylene-diol, Example 7) are heated at 250° C. in phenyl ether (DPE, 100 mL) in a Parr pressure reactor for 16 h. The polymer is precipitated into methanol (1 Liter) using a Waring blender and then extracted with methanol using a Soxhlet extractor. The solid is then vacuum dried to yield 6 grams of brown polymer. FIG. 6

Copolymerization with BPVE oligomer (8K-BPVE (4.2 g), Mn=8.5 kg/mol, Example 3) and the [bis(perfluorovinyl ether) of reduced polybutadiene diol (3 g, Example 7)] are dissolved in diphenyl ether (DPE, 50 g) in an oven-dried, 2-L reaction kettle equipped with a condenser and a mechanical stirrer with a stainless steel stir shaft, turbine and stir blade. The reaction mixture is purged with bubbling argon at 80° C. for 2 h and then the reaction is heated, with stirring, as follows: (i) 160° C., 7 h; (ii) 180° C., 16 h; (iii) 200° C., 4 h; (iv) 220° C., 2 h; (v) 230° C., 16 h; (vi) 230° C., 5 h; (vii) 240° C., 2 h; (viii) 240° C., 16 h; and (ix) 240° C., 6 h; and (x) 250° C., 3 h. The reaction mixture is then cooled and the resulting copolymer is dissolved in THF and poured slowly into vigorously stirred methanol in order to precipitate the polymer. Traces of DPE are removed from the polymer by further washing with methanol in a Soxlet extractor after which the product is dried under vacuum to give a colorless fibrous solid (6 g yield).

Example 10

Bromination of Poly[(8K-BPVE-Ethylene-Butylene]

The polymer prepared in Example 9 (5 grams) is reacted with bromine (3.5 g) in methylene chloride (100 mL) in the presence of iron (Aldrich, <10 micrometer particles, 0.25 g) and with vigorous magnetic stirring for 16 hours. The reaction mixture is treated with 10 wt. % aqueous sodium hydrogen sulfite (50 mL) until the red-brown becomes decolorized, and then the reaction mixture is filtered. The filtrate is added to methanol (400 mL) using a Waring blender and then the solid polymer is isolated by filtration. The polymer is washed with water (400 mL) and then methanol (400 mL) and is then vacuum dried.

Example 11

Attachment of Perfluorosulfonic Acid Groups to Brominated Poly[8K-BPVE-Ethylene-Butylene]

The brominated polymer of Example 10 (5 g) dissolved in N,N-dimethylformamide (40 g) with gentle warming is added drop-wise to a mixture of copper (10.5 g) and $ICF_2CF_2OCF_2CF_2SO_3^-K^+$ (16.8 g) in a mixture of N,N-dimethylformamide (50 g) and dimethylsulfoxide (10 g) with mechanical stirring under argon with heating at 115° C. in an oil bath. After complete addition the reaction is heated at 115° C. with stirring for 24 hours. The reaction mixture is centrifuged, and the liquid portion is concentrated using a rotary evaporator and is then added to 15 wt. % hydrochloric acid. The mixture is heated with stirring at 80° C. for 1 hour and then at 23° C. for 16 hours. The polymer is isolated by filtration and washed with water until the washings are neutral. The polymer dissolved at 10 wt. % in N,N-dimethylacetamide and is coated on window pane glass using a 6-mil Bird applicator and an Erichsen coater. The film is dried at 80° C. on the platen. The film is released from the glass by immersion in water. The brown film when titrated with 0.01 N sodium hydroxide has an ion exchange capacity of 1.4 milliequivalents of $H^+$ per gram. The film is flexible and is not brittle. When tested in a fuel cell with 0.4 mg $Pt/cm^2$ (TKK Pt on Vulcan, Tanaka) on the cathode and 0.05 mg $Pt/cm^2$ on the anode, the membrane with $H_2$/air produced 0.55 volts at 1.5 $A/cm^2$ with a 34 $cm^2$ active area and 85% relative humidity.

Example 12

Reaction of Polybutadiene-Diol with 1-Isocyanato-4-((1,2,2-Trifluorovinyl)Oxy)Benzene To polybutadiene diol (2 g, 0.00174 mol of OH) in tetrahydrofuran (100 mL) with magnetic stirring under argon is added 1-isocyanato-4-((1,2,2-trifluorovinyl)oxy)benzene (0.374 g, 0.00174 g). The solvent is removed using a rotary evaporator and the residue is polybutadienyl (4-((1,2,2-trifluorovinyl)oxy)phenyl)carbamate. This polymer is added as a plasticizer to sulfonated perfluorocyclobutane polymers.

Example 13

Ionomer Preparation with Bis(Perfluorovinyl Ether) of Reduced Polybutadiene with (8K-Br-BPVE)

The procedures in Examples 5 and 6 are repeated to make the ditosylate of poly(ethylene-butylene diol) (2 g, 0.00168 mol of tosylate) which is allowed to react with (4-((1,2,2-trifluorovinyl)oxy)phenyl)methanol (0.342 g, 0.00168 mol) as in Example 7. The product is the bis(trifluorovinyl ether) of poly(ethylene-butylene diol). Subsequent polymerization as in Example 8, followed by bromination as in Example 9, and then attachment of perfluorosulfonic acid groups as in Example 10 produces an ionomer with an ion exchange capacity of 1.3 meq $H^+$ per gram of coated film, which serves as a polyelectrolyte membrane in fuel cells.

Example 14

Polymerization of the Bis(Perfluorovinyl Ether) of Hydrogenated Polybutadiene with (8K-Br-BPVE)

The polymer 8K-Br-BPVE (6.09 g, Example 4) and the bis(perfluorovinyl ether) of reduced polybutadiene diol (3 g, Example 7) are heated at 250° C. in phenyl ether (100 mL) in a Parr pressure reactor for 16 h. The polymer is precipitated into methanol (1 Liter) using a Waring blender and then extracted with methanol using a Soxhlet extractor. The solid is then vacuum dried to yield 8 grams of brown polymer. This polymer reacts with $I-CF_2CF_2OCF_2CF_2SO_3^-K^+$ as in Example 11 to produce an ionomer membrane with an ion exchange capacity of 1.3 meq $H^+$/g.

Example 15

Reaction of Fomblin, a Perfluoroethyleneoxide with Telemeric Diol Groups, and 1-(Bromomethyl)-4-((1, 2,2-Trifluorovinyl)Oxy)Benzene Perfluoroethylene oxide with telomeric diol groups (Fomblin, Solvay-Solexis, 2 g) in tetrahydrofuran (50 mL) and excess sodium hydride is allowed to react with 1-(bromomethyl)-4-((1,2,2-trifluorovinyl)oxy)benzene (1 g, reference B. K. Spraul, S. Suresh, J. Jin, D. W. Smith, Jr., *J. Am. Chem. Soc.* 2006, 128 (1), 7055-7064) with magnetic stirring under argon. The reaction mixture is filtered and the solids are carefully treated with methanol. The solvent is removed from the filtrate using a rotary evaporator, and the residue is subjected to sublimation to remove unreacted 1-(bromomethyl)-4-((1,2,2-trifluorovinyl)oxy)benzene. The residue is perfluorovinyl terminated perfluoroethylene oxide.

Example 16

Reaction of Perfluorovinyl Terminated Perfluoroethylene Oxide with 8K-BPVE

Perfluorovinyl terminated perfluoroethylene oxide (3 g, Example 15) is allowed to react with 8K-BPVE (4.2 g, Example 3) in phenyl ether (100 g) under argon in a Parr pressure reactor. The mixture is heated with stirring at 160° C. for 7 h, 180° C. for 16 h, 200° C. for 4 h, 220° C. for 2 h, 230° C. for 16 h, 240° C. for 16 h, and then 3 h at 250° C. The reaction mixture is then cooled and the resulting copolymer is dissolved in THF and poured slowly into vigorously stirred methanol in order to precipitate the polymer. Traces of phenyl ether are removed from the polymer by further washing with methanol using a Soxlet extractor after which the product is dried under vacuum to give a fibrous solid (6 g yield).

Alternatively, the polymer 8K-BPVE (4.2 g, Example 3) and the perfluorovinyl terminated perfluoroethylene oxide (3 g, Example 15) are heated at 250° C. in phenyl ether (100 mL) in a Parr pressure reactor for 16 h. The polymer is precipitated into methanol (1 Liter) using a Waring blender and then extracted with methanol using a Soxhlet extractor. The solid is then vacuum dried to yield 6 grams of brown polymer, poly[(8K-BPVE-Fomblin].

Example 17

Bromination of Poly[(8K-BPVE-Fomblin]

The polymer prepared in Example 17 (5 grams) is treated with bromine (3.5 g) in methylene chloride (100 mL) in the presence of iron (Aldrich, <10 micrometer particles, 0.25 g) and with vigorous magnetic stirring for 16 hours. The reaction mixture is treated with 10 wt. % aqueous sodium hydrogen sulfite (50 mL) until the red-brown becomes decolorized, and then the reaction mixture is filtered. The filtrate is added to methanol (400 mL) using a Waring blender and then the solid polymer is isolated by filtration. The polymer is washed with water (400 mL) and then methanol (400 mL) and is then vacuum dried.

Example 18

Attachment of Perfluorosulfonic Acid Groups to Brominated Poly[8K-BPVE-Fomblin]

The brominated polymer of Example 17 (3 g) dissolved in N,N-dimethylformamide (16 g) with gentle warming is added drop-wise to a mixture of copper (4.2 g) and $ICF_2CF_2OCF_2CF_2SO_3^-K^+$ (6.72 g) in a mixture of N,N-dimethylformamide (20 g) and dimethylsulfoxide (4 g) with mechanical stirring under argon with heating at 115° C. in an oil bath. After complete addition the reaction is heated at 115° C. with stirring for 24 hours. The reaction mixture is centrifuged, and the liquid portion is concentrated using a rotary evaporator and is then added to 15 wt. % hydrochloric acid. The mixture is heated with stirring at 80° C. for 4 hours and then at 23° C. for 16 hours. The polymer is isolated by filtration and washed with water until the washings are neutral. The polymer dissolved at 10 wt. % in N,N-dimethylacetamide and is coated on window pane glass using a 6-mil Bird applicator and an Erichsen coater. The film is dried at 80° C. on the platen. The film is released from the glass by immersion in water. The brown film when titrated with 0.01 N sodium hydroxide has an ion exchange capacity of 1.2 milliequivalents of H' per gram. The film is flexible and is not brittle. When tested in a fuel cell with 0.4 mg $Pt/cm^2$ (TKK Pt on Vulcan, Tanaka) on the cathode and 0.05 mg $Pt/cm^2$ on the anode, the membrane with $H_2$/air produced 0.55 volts at 1.5 $A/cm^2$ with a 34 $cm^2$ active area and 85% relative humidity.

Example 19

Reaction of and 1-(Bromomethyl)-4-((1,2,2-Trifluorovinyl)Oxy)Benzene and Hydrogenated Polybutadiene Diol Hydrogenated polybutadiene diol (polyethylene-butylene-diol, Example 5, 3 g) in tetrahydrofuran (50 mL) and excess sodium hydride is allowed to react with 1-(bromomethyl)-4-((1,2,2-trifluorovinyl)oxy)benzene (1.5 g, reference B. K. Spraul, S. Suresh, J. Jin, D. W. Smith, Jr., *J. Am. Chem. Soc.* 2006, 128 (1), 7055-7064) with magnetic stirring under argon. The reaction mixture is filtered and the solids are carefully treated with methanol. The solvent is removed from the filtrate using a rotary evaporator, and the residue is subjected to sublimation to remove unreacted 1-(bromomethyl)-4-((1,2,2-trifluorovinyl)oxy)benzene with heating under vacuum. The residue is bis(perfluorovinyl) terminated polyethylene-butylene.

Example 20

Reaction of Bis(Perfluorovinyl) Terminated Polyethylene-Butylene with 8K-BPVE

Bis(perfluorovinyl terminated ethylene-butylene (3 g, Example 19) is allowed to react with 8K-BPVE (4.2 g, Example 3) in phenyl ether (100 g) under argon in a Parr pressure reactor. The mixture is heated with stirring at 160° C. for 7 h, then 180° C. for 16 h, then 200° C. for 4 h, then 220° C. for 2 h, then 230° C. for 16 h, then 240° C. for 16 h, and then 3 h at 250° C. The reaction mixture is then cooled and the resulting copolymer is dissolved in THF and poured slowly into vigorously stirred methanol in order to precipitate the polymer. Traces of diphenyl ether are removed from the polymer by further washing with methanol using a Soxlet extractor after which the product is dried under vacuum to give a fibrous solid (6 g yield).

Example 21

Bromination of Poly[(8K-BPVE-Polyethylene-Butylene]

The polymer prepared in Example 20 (5 grams) is reacted with bromine (3.5 g) in methylene chloride (100 mL) with vigorous magnetic stirring for 16 hours in the presence of iron (Aldrich, <10 micrometer particles, 0.25 g). The reaction mixture is treated with 10 wt. % aqueous sodium hydrogen sulfite (50 mL) until the red-brown becomes decolorized, and then the reaction mixture is filtered. The filtrate is added to methanol (400 mL) using a Waring blender and then the solid polymer is isolated by filtration. The polymer is washed with water (400 mL) and then methanol (400 mL) and is then vacuum dried.

Example 22

Attachment of Perfluorosulfonic Acid Groups to Brominated Poly[8K-BPVE-Polyethylene-Butylene]

The brominated polymer of Example 17 (3 g) dissolved in N,N-dimethylformamide (16 g) with gentle warming is added drop-wise to a mixture of copper (4.2 g) and $ICF_2CF_2OCF_2CF_2SO_3^-K^+$ (6.72 g) in a mixture of N,N-dimethylformamide (20 g) and dimethylsulfoxide (4 g) with mechanical stirring under argon with heating at 115° C. in an oil bath. After complete addition the reaction is heated at 115° C. with stirring for 24 hours. The reaction mixture is centrifuged, and the liquid portion is concentrated using a rotary evaporator and is then added to 15 wt. % hydrochloric acid. The mixture is heated with stirring at 80° C. for 1 hour and then at 23° C. for 16 hours. The polymer is isolated by filtration and washed with water until the washings are neutral. The polymer dissolved at 10 wt. % in N,N-dimethylacetamide and is coated on window pane glass using a 6-mil Bird applicator and an Erichsen coater. The film is dried at 80° C. on the platen. The film is released from the glass by immersion in water. The brown film when titrated with 0.01 N sodium hydroxide has an ion exchange capacity of 1.3 milliequivalents of $H^+$ per gram. The film is flexible and is not brittle. When tested in a fuel cell with 0.4 mg $Pt/cm^2$ (TKK Pt on Vulcan, Tanaka) on the cathode and 0.05 mg $Pt/cm^2$ on the anode, the membrane with $H_2$/air produced 0.55 volts at 1.5 $A/cm^2$ with a 34 $cm^2$ active area and 85% relative humidity.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method of making an ion conducting membrane, the method comprising:

a) reacting a compound having formula 1 with a polymer having polymer segment 2:

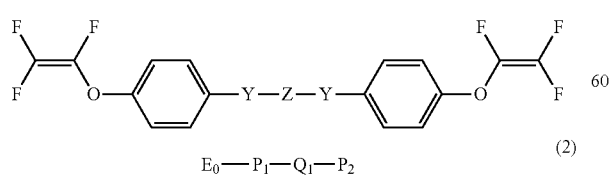

(1)

(2)

to form a copolymer having polymer segment 2 and polymer segment 3:

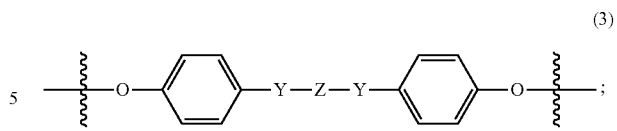

(3)

and b) forming the copolymer having polymer segment 2 and polymer segment 3 into an ion conducting membrane, wherein:

Z is a $C_{6-80}$ aliphatic, polyether, or perfluoropolyether;

Y is a divalent linking group;

$E_0$ is a hydrocarbon-containing moiety;

$Q_1$ is a perfluorocyclobutyl moiety;

$P_1$, $P_2$ are each independently absent, —O—, —S—, —SO—, —CO—, —$SO_2$—, —NH—, or —$NR_2$—; and $R_2$ is $C_{1-25}$ alkyl.

2. The method of claim 1 wherein Z is $C_{6-80}$ alkyl or $C_{6-80}$ alkenyl.

3. The method of claim 1 further comprising sulfonating the copolymer having polymer segment 2 and polymer segment 3.

4. The method of claim 1 wherein Z is

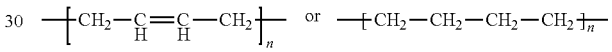

and n is an integer from 5 to 50.

5. The method of claim 1 wherein Z is

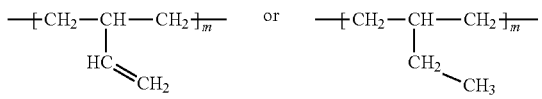

and m is an integer from 5 to 50.

6. The method of claim 1 wherein Z is

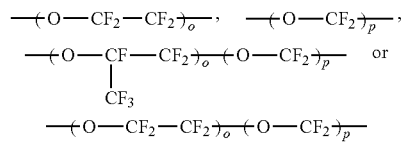

and o and p are each independently an integer from 5 to 50.

7. The method of claim 1 wherein Z is

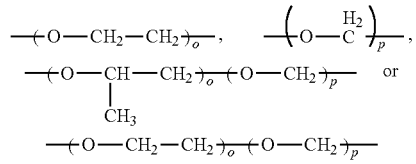

and o and p are each independently an integer from 5 to 50.

8. The method of claim 1 wherein Y is O, NH, S, or

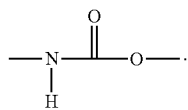

9. The method of claim 1 further comprising incorporating the ion conducting membrane into a fuel cell.

10. A method of making an ion conducting membrane, the method comprising:
a) reacting a compound having formula 1 with a polymer having polymer segment 4:

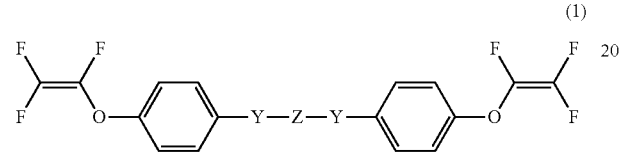

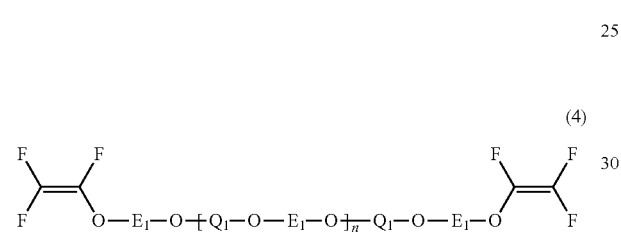

to form a copolymer having polymer segment 5:

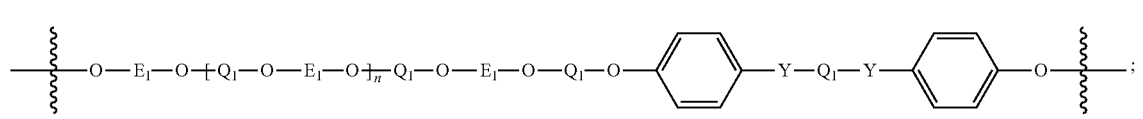

(5); and
b) forming the copolymer having polymer segment 5 into an ion conducting membrane,
wherein:
n is a number from 5 to 60;
$Q_1$ is a perfluorocyclobutyl moiety;
$E_1$ is an aromatic containing moiety;
Z is a $C_{6-80}$ aliphatic, polyether, or perfluoropolyether; and
Y is a divalent linking group.

11. The method of claim 10 further comprising sulfonating the copolymer having polymer segment 5.

12. The method of claim 10 wherein Z is $C_{6-80}$ alkyl or $C_{6-80}$ alkenyl.

13. The method of claim 10 wherein Y is O, NH, S, or

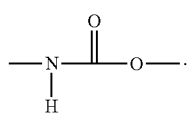

14. The method of claim 10 further comprising incorporating the ion conducting membrane into a fuel cell.

15. The method of claim 10 wherein Z is

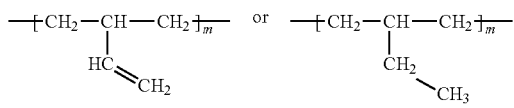

and n is an integer from 5 to 50.

16. The method of claim 10 wherein Z is

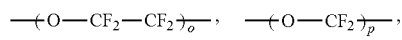
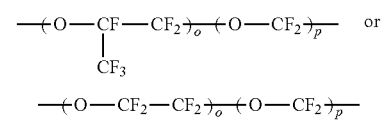

and m is an integer from 5 to 50.

17. The method of claim 10 wherein Z is

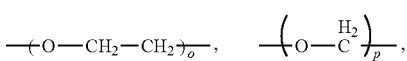

and o and p are each independently an integer from 5 to 50.

18. The method of claim 10 wherein Z is

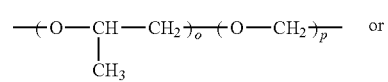
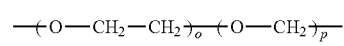

and o and p are each independently an integer from 5 to 50.

19. A method of making an ion conducting membrane, the method comprising:
a) reacting a compound having formula 1 with a polymer having formula 6:

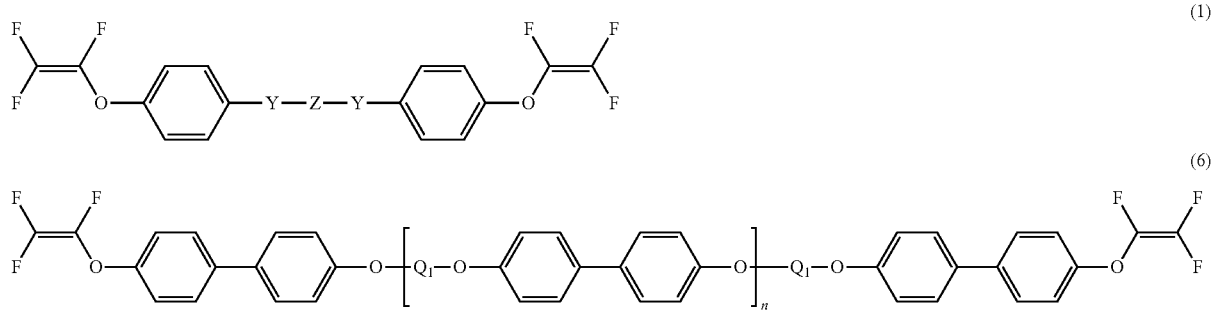

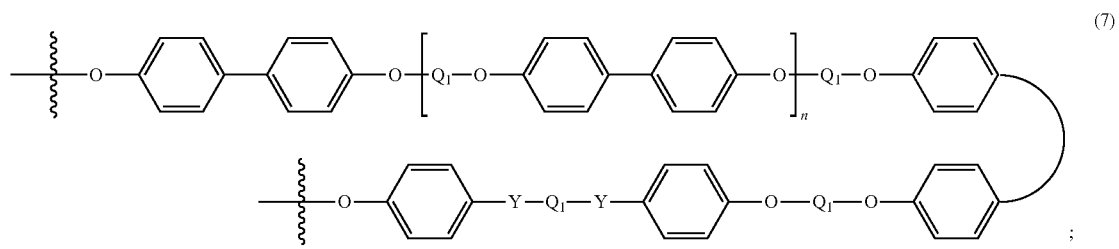

b) sulfonating the copolymer having formula 7; and
c) forming the copolymer having polymer segment 7 into an ion conducting membrane, wherein:

n is a number from 5 to 60;

$Q_1$ is a perfluorocyclobutyl moiety;

Z is a $C_{6-80}$ aliphatic, polyether, or perfluoropolyether;

$E_1$ is an aromatic containing moiety; and

Y is a divalent linking group.

20. A fuel cell including an ion conducting membrane comprising a polymer having polymer segment 2 and polymer segment 3:

$$E_0\text{—}P_1\text{—}Q_1\text{—}P_2 \quad (2)$$

-continued

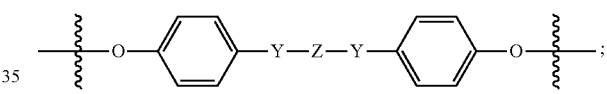

and
wherein:

Z is a $C_{6-80}$ aliphatic, polyether, or perfluoropolyether;

Y is a divalent linking group;

$E_0$ is a hydrocarbon-containing moiety;

$Q_1$ is a perfluorocyclobutyl moiety;

$P_1$, $P_2$ are each independently absent, —O—, —S—, —SO—, —CO—, —SO$_2$—, —NH—, or —NR$_2$—; and $R_2$ is $C_{1-25}$ alkyl, $C_{1-25}$ aryl or $C_{1-25}$ arylene.

21. The fuel cell of claim 20 wherein the polymer having polymer segment 2 and polymer segment 3 is sulfonated.

* * * * *